United States Patent Office 3,564,376
Patented Feb. 16, 1971

3,564,376
TIME DELAY ARMSHAFT POSITIONING CONTROL SYSTEM FOR SEWING MACHINE
James W. Mais, Washington, D.C., George M. Nicholayeff, Lake Rogerene, N.J., and Donny V. Lee, Plainview, N.Y., assignors to The Singer Company, New York, N.Y., a corporation of New Jersey
Filed Oct. 24, 1968, Ser. No. 770,211
Int. Cl. C05d 13/00
U.S. Cl. 318—466
9 Claims

ABSTRACT OF THE DISCLOSURE

A circuit is disclosed for automatically, driving a sewing machine to a predetermined position of the armshaft responsively to the normal relaxation of the foot controller. Two silicon controlled rectifiers (SCR's) are employed. One SCR controls the range of motor speeds by variable gate voltages supplied thereto by a foot controller-actuated resistance. A switch supplying A.C. line voltage to the speed control circuit is normally open in the relaxed position of the controller but is closed responsively to initial actuation of the controller. This switch is connected in shunt with the anode-cathode circuit of a second SCR which may be maintained conductive only for a predetermined time after the switch is opened. This conductive time is established by a timing capacitor which is charged through a diode only when the switch is closed, and is discharged into the gate of the second SCR when the switch is opened. A normally-open reed switch is positioned to be influenced by a small permanent magnet mounted on the handwheel which is coupled to the armshaft and closure of this switch is thus effected in a predetermined position of the handwheel. The reed switch is connected across the gate-cathode circuit of the second SCR and, when closed, removes the gate voltage to turn off the SCR and stop the motor. The relaxed position of the foot controller provides a minimum resistance for establishing a fixed low-speed high-torque positioning drive for the motor. The timing capacitor is chosen with respect to its discharge resistance to provide a limited conductive time for the second SCR at least long enough to allow the low-speed drive to find the desired stop position of the armshaft after which the second SCR is rendered inoperative because the capacitor has discharged below the firing voltage. Thus the handwheel can be readily rotated manually to reposition the armshaft without danger of interference from the positioning drive which has been rendered inoperative until the next actuation of the foot controller.

BACKGROUND OF THE INVENTION

Circuits are known in the prior art for providing desired automatic positional stops for sewing machines but these have required the use of mechanical clutch devices to decouple the motor drive to permit free manual handwheel repositioning after such a stop, to avoid adverse interference with the positioning control system. It is desirable to eliminate the necessity for such clutches which are expensive and subject to mechanical failure, and yet it is recognized that a commercially successful positioner drive must incorporate some means for de-activating the positioner drive at the end of the positioning cycle to permit normal repositioning by handwheel manipulation.

SUMMARY OF THE INVENTION

It is therefore an object of this invention to provide an automatic positioning control system for a sewing machine which does not require any mechanical means for decoupling the motor drive at the end of the positioning cycle and still permits repositioning by handwheel manipulation without interference from the positioning drive.

In attaining the objects of this invention in a preferred embodiment thereof, a second silicon controlled rectifier (SCR), rendered conductive at the beginning of the positioning cycle, supplies current to a fixed low-speed SCR motor control circuit for a predetermined time established by a timing capacitor previously charged during the normal running period of the motor. When the desired position is reached, a positional sensing switch operates to remove the gate voltage from the second SCR which turns off and stops the motor. Shortly thereafter, due to discharge of the timing capacitor below the firing voltage, the second SCR is rendered further inoperative until the next actuation of the foot controller.

DESCRIPTION OF THE INVENTION

In the drawings, FIG. 1 is a schematic diagram illustrating a preferred embodiment of a time delay positioning control system according to this invention as applied to an electrically driven sewing machine having a foot controller.

Figure 1:
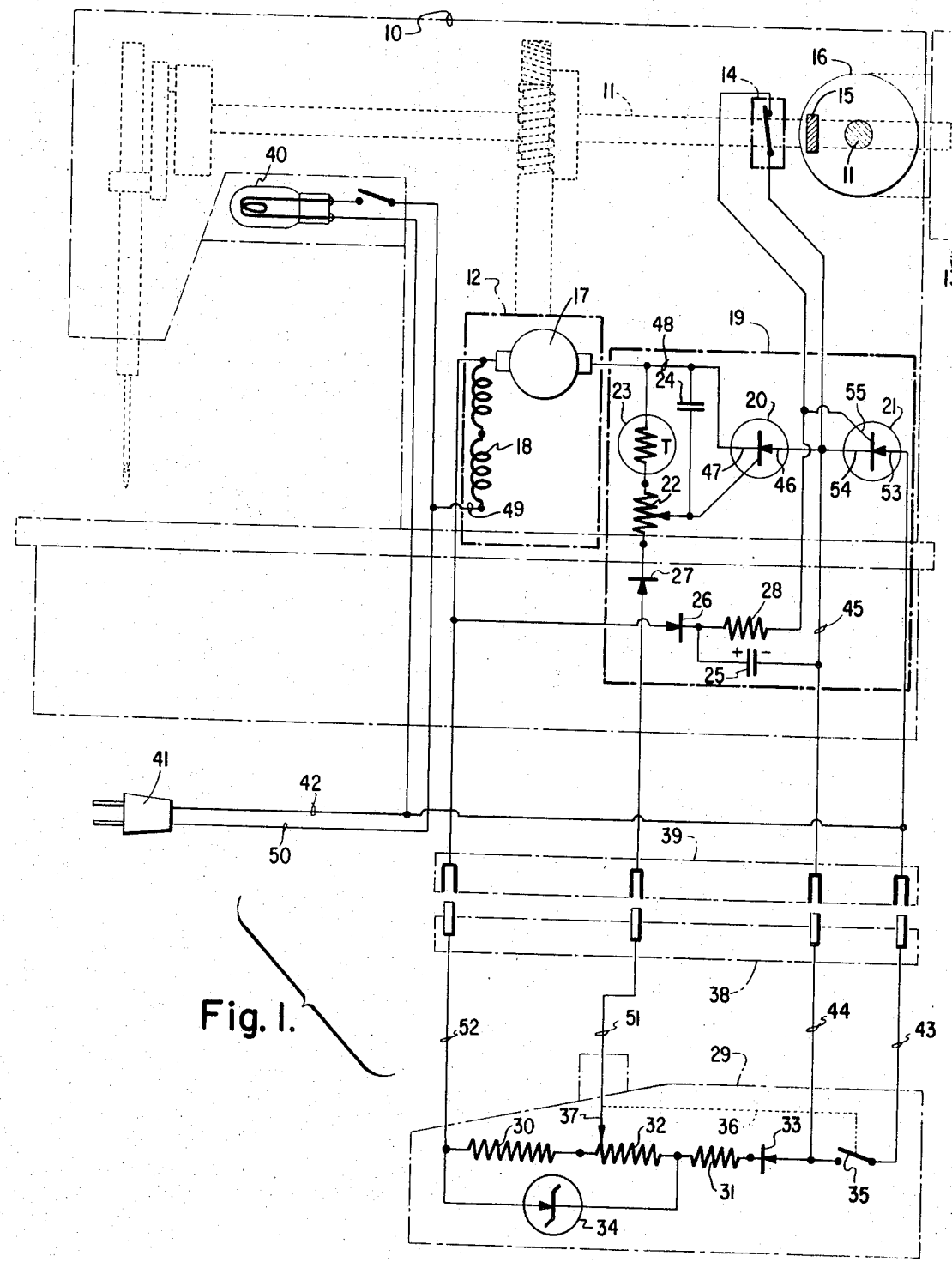

Referring now to FIG. 1, a sewing machine 10 having an armshaft 11 drivingly coupled to an electric motor 12 has a handwheel 13 fixed for rotation with the armshaft 11. A normally-open reed switch 14, secured to a stationary portion of the sewing machine 10, is positioned to be influenced by a small permanent magnet 15 carried by a portion 16 of the handwheel 13. The operation is such that when the armshaft 11 has an angular position which brings the permanent magnet 15 positionally close to the reed switch 14, the contacts of the switch will close to provide a circuit function which will be described presently. It will be understood that there is a range of rotation of the armshaft 11 (approximately 80 to 100 degrees) over which the permanent magnet 15 is effective to hold closed the switch 14 and in all other positions of the armshaft, the switch remains open.

The motor 12 includes an armature winding 17 series connected to a field winding 18. A circuit board 19 mounted preferably within the sewing machine 10 contains the following components: a first controlled rectifier 20, a second controlled rectifier 21, a trim potentiometer 22, a thermistor 23, a high-pass filter capacitor 24, a storage capacitor 25, first and second diodes 26 and 27, and a resistance 28 all connected as shown.

A foot controller 29 contains the following components: a first resistance 30, a second resistance 31, a potentiometer 32, a diode 33, a Zener diode 34 and a switch 35 connected as shown. In the relaxed position of the foot controller, as shown in FIG. 1, the switch 35 is open and the slider 37 is at the extreme left hand end of its travel on the potentiometer resistance 32. Initial actuation of the controller 29 closes switch 35 and, through a mechanical linkage indicated by dashed line 36, moves the slider 37 to the right as viewed in FIG. 1. Continued actuation of the foot controller 29 keeps switch 35 closed and moves the slider 37 further to the right. Electrical connections may be made between the external foot-controller 29 components and the circuits components located within the sewing machine by a four-prong plug 38 which engages a mating receptacle 39 on the sewing machine.

Power is supplied to the motor 12 and to a lamp 40 through a plug 41 adapted to be received in a conventional wall outlet connected to a commercial source of A.C. voltage.

It will be noted that power current may be variably supplied by the first SCR 20 to the motor 12 through the following path: plug 41, line 42, through receptacle 39 and plug 38 to line 43, switch 35, line 44 through 38 and 39 to line 45, anode 46, cathode 47, line 48, armature winding 17, field winding 18, line 49 and line 50 to plug 41. The above path requires the switch 35 to be closed and corresponds to the normal actuated position of the foot controller 29 in controlling the motor 12 over the normal running speed range of the sewing machine. This circuit is substantially the same as the circuit shown and described in the Wigington U.S. Pat. No. 3,302,088 to which reference may be made for a more complete understanding thereof. The Zener diode 34 is used as a conventional shunt voltage regulator to stabilize the reference voltage appearing on lines 51, 52 with respect to normal variations in the A.C. supply voltage. The thermistor 23 is mounted in thermal proximity to the anode 46 and is used conventionally as bias stabilization for the SCR 20 to maintain constant triggering sensitivity with respect to changes in the temperature of the SCR.

It will be noted that the second SCR 21 is poled to conduct current in the same direction as the first SCR 20 and that its anode 53 and cathode 54 are connected to the terminals of switch 35. Thus, if SCR 21 can be made to conduct when switch 35 is opened, power current will continue to be supplied to motor 12 under the control of the first SCR 20 and motor 12 will run at fixed low speed determined by the reference voltage supplied across fixed resistance 30 in the relaxed position of the foot controller 29. Means for accomplishing this will now be described.

When switch 35 is closed the storage capacitor 25 is quickly charged with the polarity shown through the diode 26 and substantially to the peak value of the A.C. supply voltage. When the switch 35 is opened, the capacitor 25 discharges through the resistance 28 into the gate 55 of SCR 21, thus triggering it into conduction. SCR 21 may remain conducting for positive excursions of its anode voltage for a time period until the voltage supplied by capacitor 25 falls below the triggering voltage. This time period may be quite accurately predetermined by adjusting the RC time constant of the resistance 28 and capacitor 25 combination and should be made at least as long as the time necessary for the motor 12, operating at the fixed low speed, to drive the armshaft 11 to the desired position as sensed by the reed switch 14 as will now be described.

It will be seen that the reed switch 14 is connected to the gate 55 and cathode 54 of the SCR 21 so that, when the contacts of switch 14 close, responsively to the influence of the permanent magnet 15 when the armshaft 11 reaches the desired predetermined position, firing voltage supplied to the SCR 21 by capacitor 25 is removed and SCR 21 will turn off on next occurrence of zero anode voltage. The switch 14 will remain closed for some 80 to 100 degrees of armshaft rotation as above described to permit some further rotation to absorb the small kinetic energy at the low speed and bring the sewing machine to a full stop with SCR 21 cut off. A short time after this stop position is reached, the capacitor 25, which has been discharging through resistance 28 and the closed switch 14, will be unable to supply enough voltage to trigger SCR 21 into conduction even if the switch 14 were to be opened. In this condition, the positioning control is completely deenergized and the armshaft 11 may be repositioned at will be manual rotation of the handwheel 13 without danger of re-energizing the positioning control by subsequent opening of the switch 14.

The subsequent actuation of the foot controller 29 will again close switch 35 and charge capacitor 25 as above explained so that it is ready to supply firing voltage to SCR 21 on the next initiation of a controlled positional stop by relaxation of the foot controller.

The importance of accurately fixing the low speed condition so that the maximum time for automatic positioning can be accurately determined and is repeatable, will now be appreciated. This enables the RC value of resistance 28 and capacitor 25 to be chosen so that SCR 21 is completely disabled closely following the end of the maximum positioning time. The voltage stabilization furnished by the Zener diode 34 and the temperature stabilization furnished by the thermistor 23 are of great assistance in bringing this about.

It is of extreme importance to proper sewing technique especially where sewing machines are equipped with automatic thread trimmers as well as with automatic needle positioners, to stop not only with the needle in the "up" position but also with the tatke-up in the "up" position, so that subsequent starting will not unthread the needle. This demands repeatably accurate positional stopping and it is an important attribute of this invention to provide this function.

Figure 2:
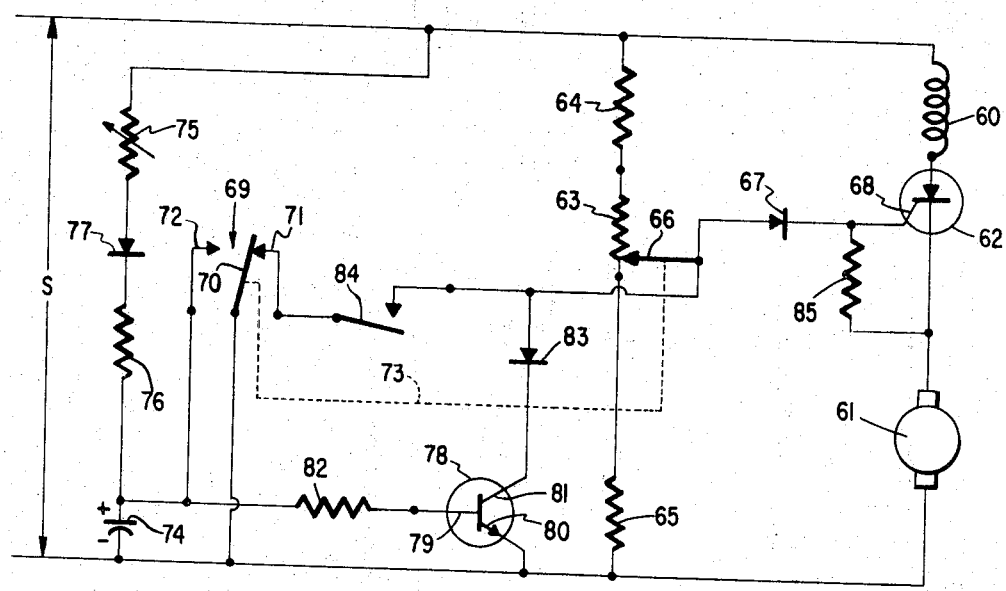
FIG. 2 is a schematic diagram illustrating a modified form of this invention.

FIG. 2 shows a modified positioning system in which, instead of using a second SCR to supply the time delay function a transistor is used to disable the control after a predetermined time initiated by relaxation of the foot controller.

Referring to FIG. 2, power current is supplied to the series-connected field winding 60 and armature winding 61 of an electric motor by an SCR 62 from a source S of A.C. voltage. The motor running speed is controlled by a potentiometer 63 in a voltage divider circuit including series resistances 64 and 65 connected across the A.C. source S. A slider 66 on potentiometer 63 provides through diode 67 variable firing voltages to the gate 68 of SCR 62. This circuit is the same as that shown and described in the Momberg et al. U.S. Reissue Pat. No. 25,203 to which reference may be made for a more complete understanding thereof.

The potentiometer 63 may be located in the foot controller so that actuation of the slider 66 is under the influence of the operator. A single-pole double-throw switch 69 having movable contact 70 and stationary contacts 71 and 72 is mechanically linked with the slider 66 as indicated by the dashed line 73.

A capacitor 74 may be charged with the polarity shown through series connected resistances 75 and 76 and diode 77 from the A.C. source S and substantially to the peak value of that voltage. The resistance 75 is made adjustable to control the time rate at which capacitor 74 is charged.

A transistor 78 having a base 79, and emitter 80 and a collector 81, has its base biasing voltage supplied from the capacitor 74 through a current-limiting resistance 82. The collector voltage is supplied from the slider 66 through a diode 83. It will be noted that the collector-emitter circuit of the transistor 78, including diode 83 is in shunt with the divider circuit portion between slider 66 and the bottom of resistance 65. The switch 84 is a normally-open reed switch influenced to close by the proximity effect of a permanent magnet mounted on the handwheel and is in all respects the same as switch 14 of FIG. 1. Resistance 85 supplies conventional bias stabilization for the SCR 62.

The operation of this circuit will now be described.

The position of slider 66 and switch 69 shown in FIG. 2 corresponds to the relaxed position of the foot controller and establishes the positioning mode for the system. When the foot controller is initially actuated, switch 69 is actuated to its other position wherein contacts 70 and 72 are engaged and slider 66 is moved upwards along potentiometer resistance 63 to select a running speed for the motor in conventional manner.

In this actuated position of the foot controller, the switch contacts 70 and 72 form a short circuit across capacitor 74 so that its voltage is zero. This also effectively removes any base bias from the transistor 78 so that it is not conducting and its collector-emitter circuit therefore does not shunt any current away from the divider circuit 63, 64 and 65.

Now when the foot controller is relaxed, switch 69 is actuated to the position shown. This removes the short circuit from the capacitor 74 and it begins to charge from the source S through series circuit 74, 75, 76 and 77. Closure of contacts 70 and 71 of switch 69 prepares a circuit through normally-open reed switch 84, which, when switch 84 closes responsively to a predetermined position of the armshaft, removes the firing voltage supplied by slider 66 and SCR 62 turns off on the next occurrence of zero anode voltage to de-energize the motor and stop the sewing machine in the predetermined position. In this relaxed position of the foot controller, the slider 66 is in the position shown and resistance 65 fixes a slow speed positional driving condition for the motor.

During this slow speed positioning period, the capacitor 74 has been charging at a rate set by resistance 75 and this gradually increases the positive bias on base 79 to drive transistor 78 towards saturation which will ultimately remove the firing voltage supplied at slider 66 by the low impedance path through 83, 81 and 80. This will permit SCR 62 to turn off and completely de-energize the positioning system.

Subsequent actuation of the foot controller closes contacts 70 and 72 to short circuit capacitor 74 which returns the transistor 78 to cut-off condition and permits firing voltage to again be supplied from slider 66 to gate 68 thus turning on SCR 62 to supply power current to the motor for normal running speeds.

The resistance 75 is adjusted so that the transistor 78 reaches saturation in a predetermined time after foot controller relaxation, which time is at least equal to the maximum time required for the slow-speed drive to rotate the armshaft to the desired predetermined position.

Figure 3:
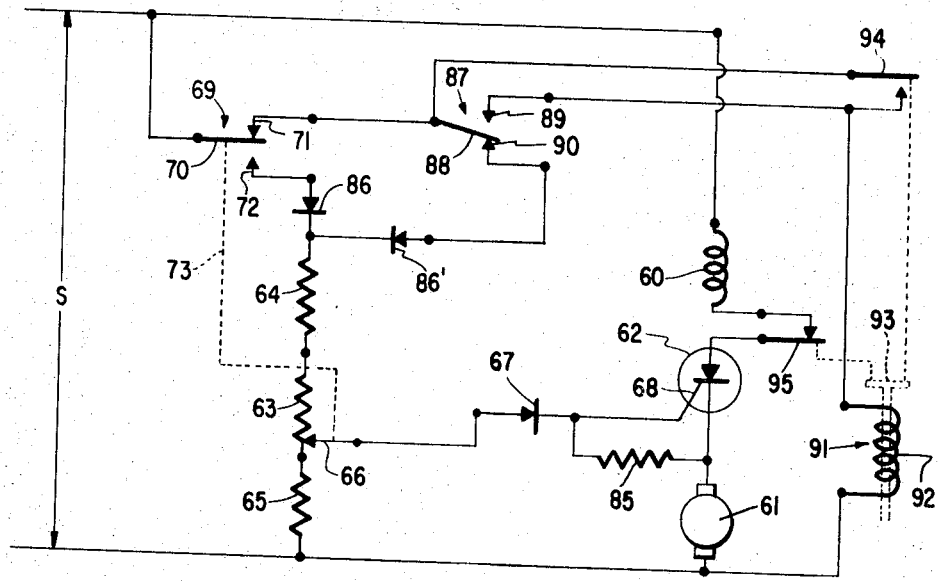
FIG. 3 is a schematic diagram illustrating a further modified form of this invention.

FIG. 3 shows another modification in which a conventional time-delay is used to supply the time-delay function. Elements which have the same functions in the circuit of FIG. 3 as do those of the circuit of FIG. 2 bear the same reference numerals for easy identification. Diodes 86 and 86' are merely for the purpose of supplying a unidirectional voltage to the series divider resistances 63, 64 and 65 and permits these resistances to be physically smaller, but the circuit function remains the same.

The reed switch 87, is in this embodiment, a single-pole double-throw switch having a movable contact 88 and two stationary contacts 89 and 90.

The switch 87 will be positioned to be influenced by the permanent magnet on the handwheel to close contacts 88 and 89 when the armshaft reaches a predetermined position and will remain closed for some further 80 to 100 degrees of rotation of the armshaft. In all other positions of the armshaft, contacts 88 and 90 will be closed. A conventional time delay relay 91 has a winding 92 and an armature 93 which actuates a normally-open switch 94 and a normally-closed switch 95 connected as shown.

The position of the parts shown in FIG. 3 is with the foot controller in its relaxed position. When the foot controller is initially actuated, switch 69 is actuated to its other position wherein contacts 70 and 72 are closed to supply voltage to the divider 63 and 64 and 65. The slider 66 is moved upwards along the potentiometer resistance 63 to select a running speed for the motor in conventional manner. It will be noted that power current to the motor windings 60 and 61 is permitted through closed contacts of the switch 95 because relay 92 is de-energized through the now open contacts 70 and 71.

Now, when the foot controller is relaxed, switch 69 is actuated to the position shown. If the armshaft is not in its desired predetermined position, contacts 88 and 90 of reed switch 87 will be closed furnishing voltage to the divider 63, 64 and 65 through diode 86'. The slider 66, being in the position shown, will establish a fixed low speed condition for the motor which will drive the armshaft to a position where contacts 88 and 90 will open to remove firing voltage from the SCR 62. Slight further rotation will absorb the kinetic energy and bring the sewing machine to a stop within the aforementioned range. Further, since reed switch contacts 88 and 89 are now closed, winding 92 of the time-delay relay 91 is energized and, after a predetermined time, fixed by the relay itself, switch 95 will open to break the power current path to the motor and completely de-energize the positioning system so that subsequent closure of contacts 88 and 90 by manual manipulation of the handwheel will have no effect. Switch 94 will close to latch in the relay 91.

Subsequent actuation of the foot controller opens contacts 70 and 71 which de-energizes the relay winding 92 and resets switch 95 to closed position to permit motor windings 60 and 61 to receive power current controlled by SCR 62 which has now been triggered into conduction by firing voltage supplied thereto by the divider circuit 63, 64 and 65 now energized through closed contacts 70 and 72 of switch 69.

While there have been illustrated and described herein particular embodiments of this invention, various modifications will obviously occur to those skilled in the art. It is to be understood, therefore, that this invention is not to be limited to the particular arrangements disclosed and it is intended in the appended claims to cover all modifications which do not depart from the true spirit and scope of this invention.

Having thus set forth the nature of the invention, what is claimed herein is:

1. A positioning control system for a sewing machine having an electric motor fed from an A.C. source and drivingly connected to the armshaft thereof comprising: a controlled rectifier for supplying controlled power current from said A.C. source to the motor for speed control thereof, a foot controller having actuated and relaxed positions including an operator-influenced variable resistance for controlling the firing voltage to said rectifier, first means rendered effective responsively to the relaxed position of the foot controller to de-energize the motor at the end of a predetermined time period, second means responsively to the relaxed position of the foot controller to establish a minimum resistance and fix a low-speed driving condition of the motor, and switch means operated responsively to a predetermined motor-driven position of the armshaft for removing the gate voltage from the rectifier.

2. A positioning control system in accordance with claim 1 wherein said first means includes a second controlled rectifier connected in series with and poled to supply current in the same direction as the first controlled rectifier.

3. A positioning control system in accordance with claim 1 wherein said first means includes a normally cut-off transistor which is gradually biased to saturation to remove the firing voltage to the controlled rectifier.

4. A positioning control system in accordance with claim 1 wherein said first means includes a time delay relay which opens the motor circuit a definite time after its winding is energized by operation of the position-responsive switch.

5. A positioning control system for a sewing machine having an electric motor fed from an A.C. supply and drivingly connected to the armshaft thereof comprising: a first controlled rectifier for supplying controlled power current to the motor for speed control thereof, a foot controller having actuated and relaxed positions including an operator-influenced variable resistance for variably gating said first rectifier in the actuated position, means operative responsively to the relaxed position of the foot controller to establish a minimum resistance to fix a low-speed driving condition of the motor, a second controlled rectifier rendered effective to supply current from the A.C. supply to said first rectifier responsively to the relaxed position of the foot controller, means supplying firing gate voltage to the second rectifier for a predetermined time after the foot controller reaches the relaxed position, and switch means operated responsively to a predetermined motor-driven position of the armshaft for removing the gate voltage from the second rectifier.

6. A positioning control system in accordance with claim 5, wherein the means supplying the gate voltage to the second rectifier includes a capacitor and a diode for charging the capacitor from the A.C. supply only during normal actuation of the foot controller.

7. A positioning control system in accordance with claim 5 wherein the position responsive switch means is a normally-open switch connected across the gate-cathode circuit of the second controlled rectifier.

8. A positioning control system in accordance with claim 5, wherein a normally-closed switch actuated to open responsively to the relaxed position of the foot controller has its terminals connected respectively to the anode and the cathode of the second controlled rectifier.

9. A positioning control system in accordance with claim 5 wherein the predetermined time period is made at least as long as the maximum time required for the low-speed drive to attain the desired stop position of the armshaft.

References Cited

UNITED STATES PATENTS

| Re. 25,203 | 7/1962 | Momberg | 318—246 |
| 2,790,280 | 4/1957 | Wilson | 318—466 |
| 2,876,407 | 3/1959 | Winz | 318—275 |
| 3,163,811 | 12/1964 | Vaucher | 318—275 |
| 3,302,088 | 1/1967 | Wigington | 318—246 |

BENJAMIN DOBECK, Primary Examiner

U.S. Cl. X.R.

318—551; 112—219